Nov. 18, 1941.  R. J. SEJKORA  2,263,368
POWER LAWN MOWER
Filed June 20, 1939  4 Sheets-Sheet 3
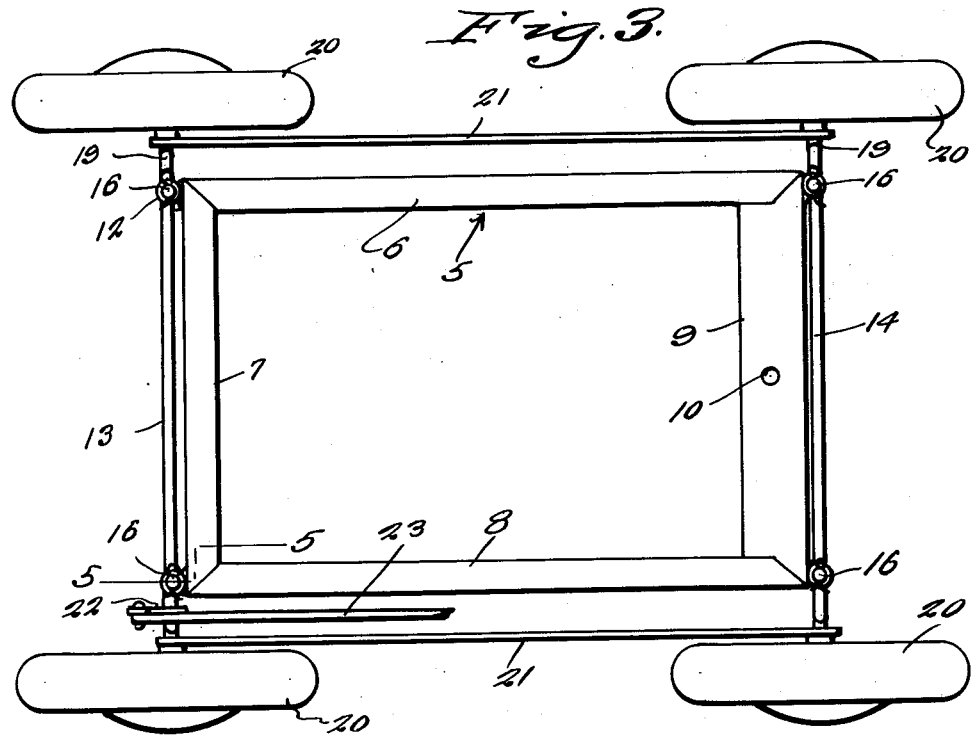
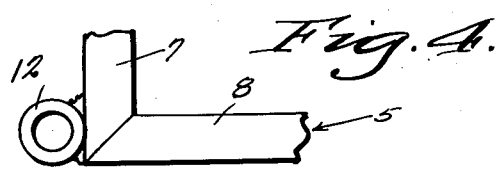
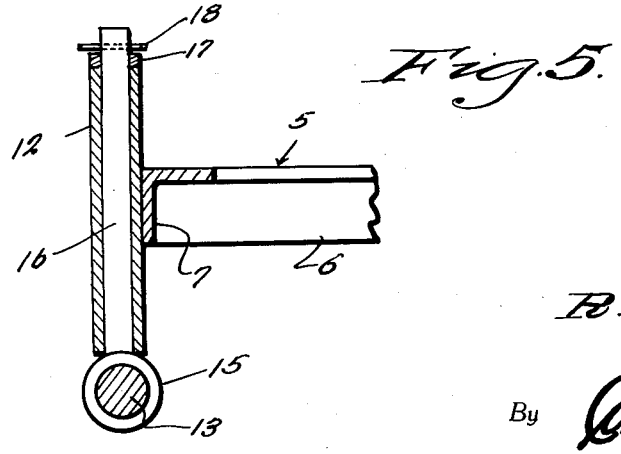
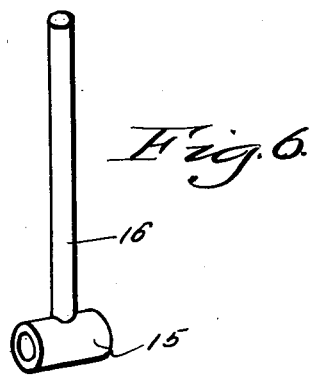
Inventor
R. J. Sejkora
By Clarence A. O'Brien
and Hyman Berman
Attorneys Nov. 18, 1941.    R. J. SEJKORA    2,263,368
POWER LAWN MOWER
Filed June 20, 1939    4 Sheets-Sheet 4
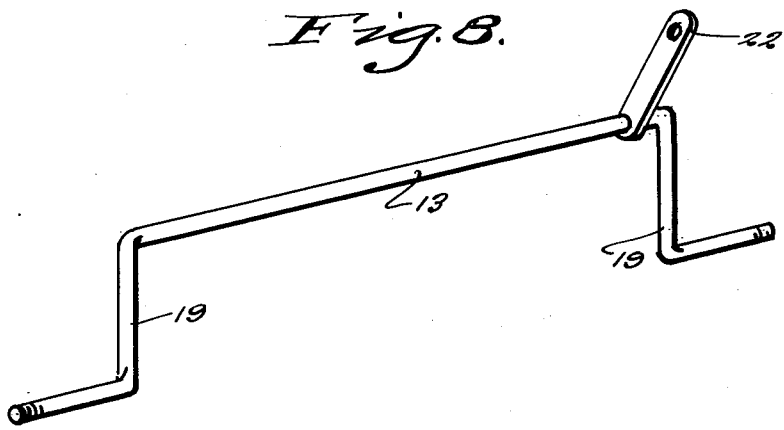
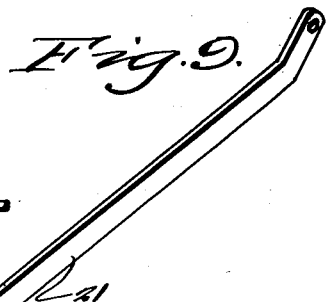
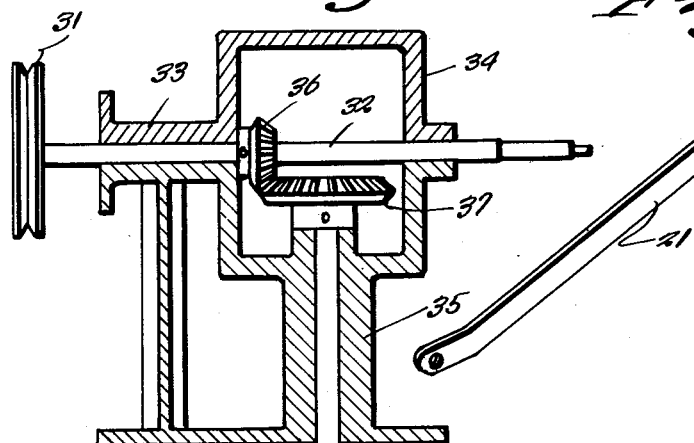
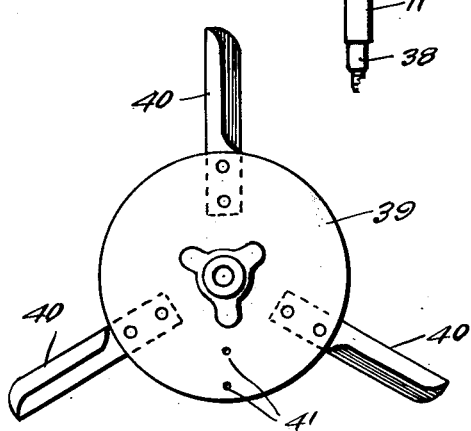
Inventor
R. J. Sejkora
By Clarence A. O'Brien
and Hyman Berman
Attorneys Patented Nov. 18, 1941

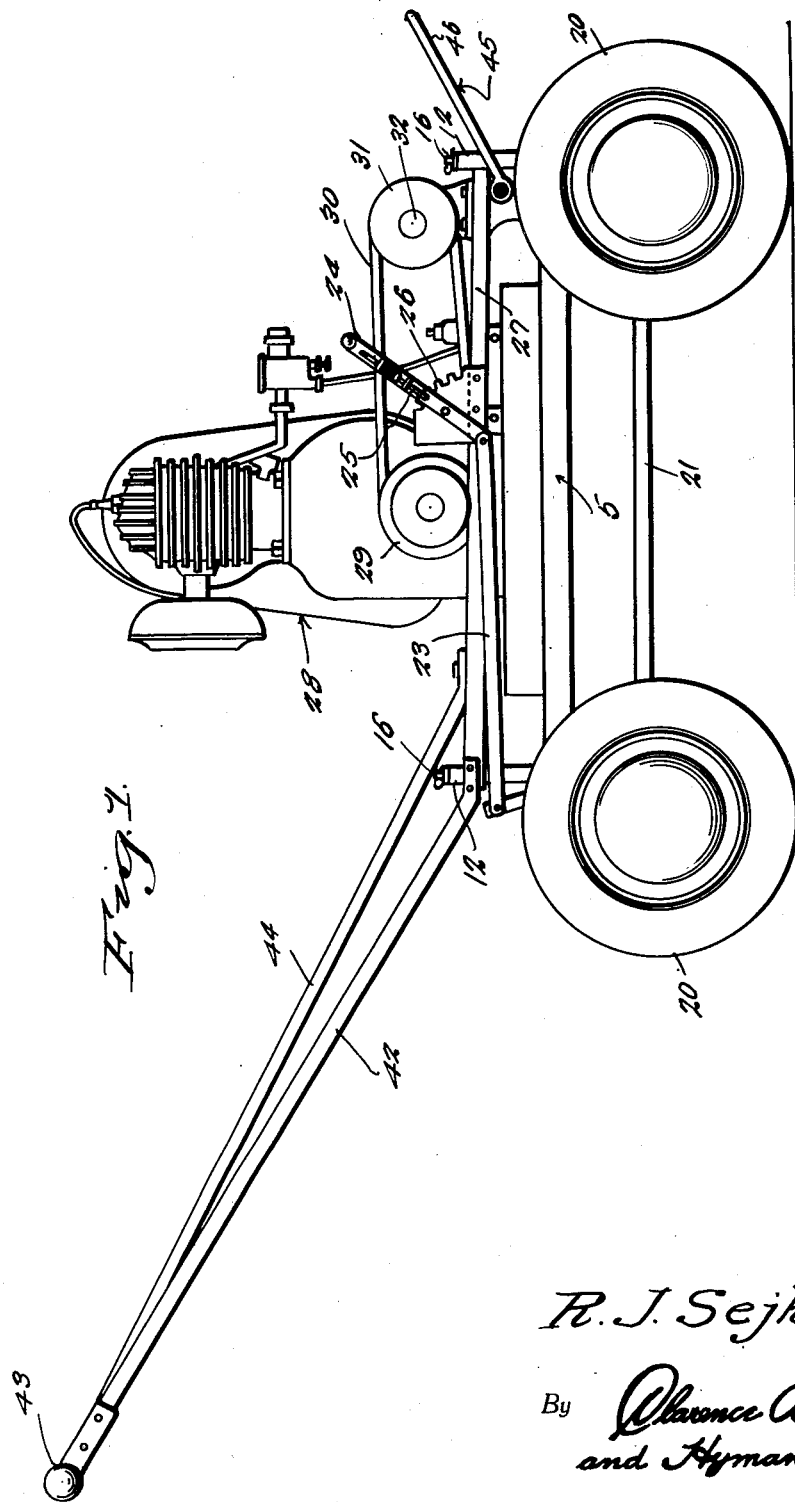

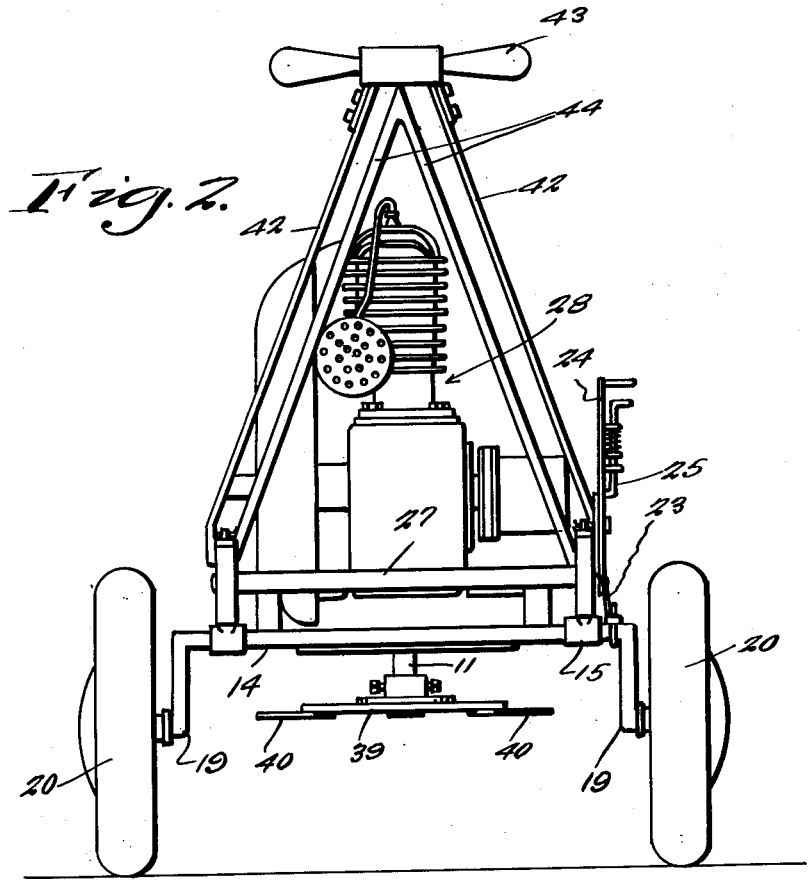
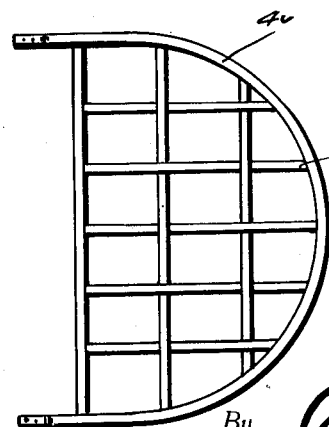

2,263,368

UNITED STATES PATENT OFFICE 2,263,368

POWER LAWN MOWER

Rudolph Joseph Sejkora, Chapman, Kans.

Application June 20, 1939, Serial No. 280,174

1 Claim. (Cl. 280—44)

This invention appertains to new and useful improvements in lawn mowers and more particularly to mowers of the power driven type.

The principal object of the present invention is to provide a power driven lawn mower which will not only cut grass of medium height, but also substantially high standing weeds.

The secondary object of the invention is to provide a machine of the character stated which can be readily adjusted to meet varying conditions.

A third object of the invention is to provide a machine of the character stated which is of sturdy construction and not susceptible to the ready development of defects.

In the drawings:

Figure 1 is a side elevational view of the entire machine.

Figure 2 is a rear elevational view.

Figure 3 is a top plan view of the chassis.

Figure 4 is a fragmentary top plan view showing one corner of the chassis frame.

Figure 5 is a fragmentary vertical sectional view through one corner of the chassis frame.

Figure 6 is a perspective view of one of the axle bearings.

Figure 7 is a plan view of the guard.

Figure 8 is a perspective view of one of the axles.

Figure 9 is a perspective view of one of the axle connecting bars.

Figure 10 is a vertical sectional view through the gear assembly.

Figure 11 is a plan view of the cutting unit.

Referring to the drawings wherein like numerals designate like parts, it can be seen that the machine includes the frame generally referred to by numeral 5, made up of the angle iron members 6, 7, 8 and 9, the latter being somewhat broader than the others and having the opening 10 therein through which the driven shaft 11 is disposed.

Each corner of the frame 5 has a vertically disposed barrel 12 welded or otherwise secured thereto. Numerals 13 and 14 represent the axles of the vehicle which extend through sleeves 15 and these sleeves have upstanding stems or spindles 16 disposed upwardly through the aforementioned barrels 12. Washers 17 are provided on the upper portions of the spindles 16 and cotter keys 18 are disposed through the upper ends of the spindles 16.

As can be seen in Figure 2, the axles 13 and 14 have crank ends 19 terminating in stub spindles on which the wheels 20 are mounted.

The cranks 19 of the axles 13 and 14 at one side of the machine are connected by the link bar 21.

An arm 22 is suitably secured to the rear axle 13 adjacent the corresponding journal sleeve 15 and from this arm 22 extends the bar 23 to connect to the lower end of the hand lever 24, which has a detent 25 thereon cooperative with the segmental rack 26, the latter being secured to the edge of the platform 27, this platform being mounted upon the aforementioned frame 5.

Mounted upon the platform 27 is a conventional type of gasoline engine generally referred to by numeral 28 and of the type usually used in conjunction with lawn mowers. Numeral 29 represents the drive pulley of this motor which operates the belt 30, the latter being trained over the pulley 31 on the shaft 32. This shaft 32 is journaled through the bearing 33 which is at one side of the gear box 34. The gear box 34 is supported by the pedestal 35, bored to accommodate the driven shaft 11. The shaft 32 extends through the gear box 34 and is equipped with the beveled pinion 36 meshing with the beveled gear 37, the latter being located on the upper end of the driven shaft 11.

Disposed on the shoulder portion 38 of the shaft 11 is the cutter disk 39 and a nut on this shaft prevents displacement of the cutter disk 39.

Cutter blades 40 are secured to the disk 39 at 120 degree intervals. As shown in Figure 11, an extra set of openings 41 are formed in the disk 39 in alignment with one of the other sets of openings so that in the event only two cutter blades 40 are desired, one of the blades 40 can be removed into the location of the opening 41 while the other blade out of alignment can be removed.

A pair of bars 42 extend inclinedly from the rear end of the platform 27 and are attached to the handle structure 43. Brace bars 44 extend from the handle structure and connect to the top of the platform 27 forwardly of the rear end thereof.

At the forward end of the platform 27 is a guard structure generally referred to by numeral 45 and this inclines upwardly in a forward direction as shown in Figure 1. This guard consists of the substantially U-shaped frame 46 having its end portions secured to the platform 27 and the grill work 47 installed therein.

When the device is to be operated the same is pushed over the surface upon which the grass or other vegetation is to be cut by means of the handle 43 with the engine 28 rotating the disk 39 to operate the cutting blades 40, through the shafts 11 and 32 and belt drive 30. To determine the height at which the grass will be cut, the levers 21 and 23 are operated to swing the crank axles 13 and 14 through the medium of the lever 24 which is held in adjusted position by the detent 25 to hold the crank axles in adjusted position. In this manner the blade carrying frame 5 may be raised or lowered as conditions may demand.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a lawn mower, a substantially rectangular-shaped frame provided with vertically disposed sleeves at the corner portions thereof, elongated members disposed vertically through the sleeves and each provided with a horizontally disposed sleeve at its lower end and a thrust element at its upper end, axles journaled through the horizontal sleeves, each axle being provided with a crank at each end thereof, wheels for supporting the frame carried by the cranks, a connecting member between the cranks at one side of the frame, an arm extending from one end of one of the axles inwardly of the adjacent crank, a swingable hand lever provided with rack and detent means, and a connection between the arm and the said hand lever.

RUDOLPH JOSEPH SEJKORA.